US012068560B2

(12) United States Patent
Raymond

(10) Patent No.: US 12,068,560 B2
(45) **Date of Patent: *Aug. 20, 2024**

(54) CORADIAL CONNECTOR

(71) Applicant: The ESAB Group Inc., Florence, SC (US)

(72) Inventor: Andrew Raymond, Lebanon, NH (US)

(73) Assignee: THE ESAB GROUP INC., Florence, SC (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/694,818

(22) Filed: Mar. 15, 2022

(65) Prior Publication Data

US 2022/0200216 A1 Jun. 23, 2022

Related U.S. Application Data

(63) Continuation of application No. 16/942,849, filed on Jul. 30, 2020, now Pat. No. 11,296,466.

(51) Int. Cl.

| | |
|---|---|
| ***B23K 9/167*** | (2006.01) |
| ***H01R 13/10*** | (2006.01) |
| ***H01R 13/627*** | (2006.01) |
| ***H01R 24/40*** | (2011.01) |
| *H01R 103/00* | (2006.01) |

(52) U.S. Cl.

CPC ............. *H01R 24/40* (2013.01); *H01R 13/10* (2013.01); *H01R 13/6271* (2013.01); *H01R 2103/00* (2013.01)

(58) Field of Classification Search

CPC .... H01R 24/40; H01R 13/00; H01R 13/6271; H01R 13/005; B23K 9/323

USPC .................................................. 439/191, 352

See application file for complete search history.

(56) References Cited

U.S. PATENT DOCUMENTS

| | | | | |
|---|---|---|---|---|
| 3,569,903 A * | 3/1971 | Brishka | H01R 13/6277 | 403/321 |
| 3,641,479 A | 2/1972 | O'Brien | | |
| 3,753,206 A | 8/1973 | Busuttil | | |
| 3,771,099 A * | 11/1973 | Dinse | B23K 9/323 | 439/191 |

(Continued)

FOREIGN PATENT DOCUMENTS

| | | |
|---|---|---|
| DE | 4325289 A1 | 4/1995 |

OTHER PUBLICATIONS

Notification of Transmittal of International Search Report and Written Opinion including International Search Report for International Application No. PCT/US2021/040799 dated Oct. 15, 2021, 15 pages.

*Primary Examiner* — Neil Abrams

(74) *Attorney, Agent, or Firm* — Edell, Shapiro & Finnan, LLC

(57) ABSTRACT

A coradial connector is disclosed. The coradial connector system includes a plug and socket. The plug has a plug housing, a plug process conductor, a plug signal conductor disposed coaxially with the plug process conductor, and a plug insulator disposed coaxially with the plug process conductor, between the plug process conductor and signal conductor. The socket includes a socket housing, a socket process conductor, a socket signal conductor disposed coaxially with the socket process conductor, and a socket insulator disposed coaxially with the socket process conductor, between the socket process conductor and signal conductor.

20 Claims, 12 Drawing Sheets

(56) References Cited

U.S. PATENT DOCUMENTS

| | | | | |
|---|---|---|---|---|
| 3,847,287 | A * | 11/1974 | Dinse | B23K 9/133 219/136 |
| 4,403,959 | A | 9/1983 | Hatakeyama | |
| 4,549,068 | A * | 10/1985 | Kensrue | B23K 9/323 219/137.31 |
| 4,557,535 | A | 12/1985 | Keane | |
| 4,557,538 | A | 12/1985 | Chevalier | |
| 4,655,709 | A | 4/1987 | Fleer | |
| 4,840,574 | A * | 6/1989 | Mills | H01R 13/66 439/378 |
| 5,007,852 | A | 4/1991 | Dean | |
| 5,010,228 | A * | 4/1991 | Nishiwaki | B23K 9/323 219/86.25 |
| 5,052,941 | A | 10/1991 | Hernandez-Marti | |
| 5,074,802 | A * | 12/1991 | Gratziani | H05H 1/36 439/192 |
| 5,080,593 | A | 1/1992 | Neumann et al. | |
| 5,132,513 | A | 7/1992 | Ingwersen et al. | |
| 5,208,436 | A | 5/1993 | Blankenship | |
| 5,405,269 | A | 4/1995 | Stupecky | |
| 5,571,427 | A | 11/1996 | Dimock | |
| 5,624,686 | A | 4/1997 | Shimoda | |
| 5,637,006 | A | 6/1997 | Almeras | |
| 5,820,416 | A | 10/1998 | Carmichael | |
| 6,066,835 | A | 5/2000 | Hanks | |
| 6,149,469 | A | 11/2000 | Kim | |
| 6,319,003 | B2 | 11/2001 | Mosimann | |
| 6,472,631 | B1 | 10/2002 | Eickhoff et al. | |
| 6,683,273 | B2 | 1/2004 | Conway et al. | |
| 6,713,711 | B2 | 3/2004 | Conway et al. | |
| 6,852,943 | B2 | 2/2005 | Eickhoff et al. | |
| 7,041,935 | B2 | 5/2006 | Raymond et al. | |
| 7,135,655 | B2 | 11/2006 | Tomiyasu et al. | |
| 7,176,404 | B2 | 2/2007 | Herres | |
| 7,189,113 | B2 * | 3/2007 | Sattele | H01R 13/6277 439/578 |
| 7,632,130 | B2 * | 12/2009 | Sami | H01R 13/6395 439/352 |
| 7,762,830 | B2 | 7/2010 | Roberts | |
| 8,328,570 | B2 | 12/2012 | Sauter | |
| 8,505,871 | B2 * | 8/2013 | Walborn | A61M 39/26 251/129.01 |
| 9,061,367 | B2 | 6/2015 | Ihde | |
| 9,375,801 | B2 | 6/2016 | Cenko | |
| 9,643,278 | B2 | 5/2017 | Anzengruber et al. | |
| 9,742,140 | B2 | 8/2017 | Crowe | |
| 10,348,016 | B2 | 7/2019 | Carletti | |
| 10,856,400 | B2 | 12/2020 | Currier | |
| 10,906,123 | B2 | 2/2021 | Pike | |
| 11,296,466 | B2 * | 4/2022 | Raymond | H01R 13/6271 |
| 11,338,383 | B2 * | 5/2022 | Preundler | B23K 9/323 |
| 2002/0127512 | A1 * | 9/2002 | Chen | A61C 17/20 433/119 |
| 2009/0212027 | A1 | 8/2009 | Borowy et al. | |
| 2013/0252461 | A1 * | 9/2013 | Gross | H01R 13/005 439/577 |
| 2018/0133828 | A1 | 5/2018 | Pike et al. | |
| 2020/0086414 | A1 | 3/2020 | Preundler | |
| 2020/0381853 | A1 | 12/2020 | Bonzon | |
| 2021/0057839 | A1 | 2/2021 | Haney | |
| 2021/0339331 | A1 | 11/2021 | Preundler | |

* cited by examiner

CORADIAL CONNECTOR

CROSS-REFERENCE TO RELATED APPLICATION

This application is a continuation of U.S. patent application Ser. No. 16/942,849, filed Jul. 30, 2020, the entirety of which is incorporated herein by reference.

FIELD OF INVENTION

The present invention relates to the field of electrical cable connectors and, in particular, a coradial connector for cutting and welding torches.

BACKGROUND

Generally, electrical cables for industrial devices, such as cutting and welding devices, include a main conductor for conducting a process current/voltage and a plurality of signal conductors for conducting a plurality of control signals. The signal conductors are generally radially offset from the main conductor. Conventional connectors for conventional cables include a plug with a main pin and a socket with a corresponding a main receptacle. The connector further includes one or more signal pins in the plug that correspond to one or more signal receptacles in the socket. Still further, connectors for cutting and welding devices may include gas conduits in their plugs and sockets. The signal pins and receptacles are typically radially offset from the main pin/receptacle and/or the gas conduits. Accordingly, the plug must be radially aligned with the socket to properly connect the pins with the corresponding receptacles. Once connected, the plug cannot rotate within the socket.

Further, due to the radial arrangement of the pins and receptacles, conventional plug and socket connectors may have a large diameter. In welding or cutting applications, the large diameter of the connector may cause the socket to occupy a large portion of a housing a of a power supply. Additionally, since the plug is unable to rotate when it engages the socket, the cable and/or device may not be reoriented or rotated once the plug is connected to a socket. Thus, if devices for which the connector is providing a connection are not keyed to the connector in a particular orientation, the devices may have a natural bias that makes the devices hard or uncomfortable to grasp or position. For example, if a plasma torch has a connector oriented to connect with a socket when the torch is an upside-down position, the connector may impart a torsional force or bias on the cable between the torch and the connector that consistently torques the torch out of a user's grasp (e.g., towards an upside-down position). To avoid this, radially arranged connectors must be carefully installed onto cables and/or devices, which is tedious and inefficient during manufacturing or product assembly.

In view of at least the aforementioned issues, a compact connector having a plug and socket may be desirable. Moreover, connectors that do not require the plug to be radially oriented with the socket, so that, for example, the plug can rotate while engaged with the socket, may be desirable.

SUMMARY

The present invention relates to a coradial connector for electrical and/or fluid cable. In accordance with at least one embodiment of the present invention, the coradial connector includes a plug and socket. The plug has a plug housing, a plug process conductor, a plug signal conductor disposed coaxially with the plug process conductor, and a plug insulator disposed coaxially with the plug process conductor, between the plug process conductor and signal conductor. The socket includes a socket housing, a socket process conductor, a socket signal conductor disposed coaxially with the socket process conductor, and a socket insulator disposed coaxially with the socket process conductor, between the socket process conductor and signal conductor.

In accordance with at least one embodiment of the present invention, the plug signal conductor is one of a plurality of plug signal conductors, and the plug insulator is one of a plurality of plug insulators. The plurality of plug signal conductors are alternatively arranged with the plurality of plug insulators along a longitudinal axis of the plug housing. The socket signal conductor is one of a plurality of socket signal conductors, and the socket insulator is one of a plurality of socket insulators, wherein the plurality of socket signal conductors are alternately arranged with a plurality of socket insulators along a longitudinal axis of the socket housing.

In accordance with at least one embodiment of the present invention, the plurality of plug signal conductors, the plurality of socket signal conductors, the plurality of plug insulators, and the plurality of socket insulators have a circular shape.

In accordance with at least one embodiment of the present invention, each plug signal conductor of the plurality of plug signal conductors corresponds to one socket signal conductor of the plurality of socket signal conductors.

In accordance with at least one embodiment of the present invention, the plurality of plug signal conductors are concentric with the plurality of socket signal conductors In accordance with at least one embodiment of the present invention, the socket housing further includes a tab. The plug housing further includes a radially extending protrusion having a bearing surface, the tab being configured to removably engage the bearing surface. The plug further includes a translatable collar having a plurality of fingers radially disposed about the plug housing and the collar is configured to disengage the tab from the bearing surface in response to being translated.

In accordance with at least one embodiment of the present invention, the plug is configured to rotatably coupled to the socket.

In accordance with at least one embodiment of the present invention, a plug assembly for a coradial connector includes a plug housing, a process conductor; a signal conductor disposed coaxially with the process conductor, and a plug insulator disposed coaxially with the process conductor, between the process conductor and signal conductor.

In accordance with at least one embodiment of the present invention, the plug insulator electrically isolates the signal conductor from the process conductor.

In accordance with at least one embodiment of the present invention, the signal conductor is one of a plurality of signal conductors, and the plug insulator is one of a plurality of plug insulators.

In accordance with at least one embodiment of the present invention, the plurality of signal conductors and the plurality of plug insulators have a circular shape.

In accordance with at least one embodiment of the present invention, the plurality of signal conductors and the plurality of plug insulators are alternatively arranged along a longitudinal axis of the plug assembly.

In accordance with at least one embodiment of the present invention, a plurality of wires radially disposed about the process conductor, wherein each wire of the plurality of wires is electrically coupled to a corresponding signal conductor of the plurality of signal conductors.

In accordance with at least one embodiment of the present invention, the plug assembly further includes a release collar disposed about the plug housing.

In accordance with at least one embodiment of the present invention, a socket assembly for a coradial connector includes socket housing, process conductor, a signal conductor disposed coaxially with the process conductor, and socket insulator disposed coaxially with the process conductor, between the process conductor and signal conductor.

In accordance with at least one embodiment of the present invention, the socket insulator electrically isolates the signal conductor from the process conductor.

In accordance with at least one embodiment of the present invention, the signal conductor is one of a plurality of signal conductors, and the socket insulator is one of a plurality of socket insulators.

In accordance with at least one embodiment of the present invention, the plurality of signal conductors and plurality of socket insulators have a circular shape.

In accordance with at least one embodiment of the present invention, the plurality of signal conductors and the plurality of socket insulators are alternatively arranged along a longitudinal axis of the socket assembly.

In accordance with at least one embodiment of the present invention, the socket assembly further includes a plurality of wires radially disposed about the process conductor, wherein each wire of the plurality of wires is electrically coupled to a corresponding signal conductor of the plurality of signal conductors.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures.

DETAILED DESCRIPTION

The following description is not to be taken in a limiting sense but is given solely for the purpose of describing the broad principles of the invention. Embodiments of the invention will be described by way of example, with reference to the above-mentioned drawings showing elements and results according to the present invention.

Generally, the connection system and method for connecting a plug and socket presented herein include a connection system having a plug that can be inserted into corresponding socket in any radial alignment with respect to the socket while maintaining proper connections between corresponding conductors in the plug and socket. Additionally, once engaged by the socket, the plug may rotate about its longitudinal axis without disengaging corresponding conductors between the plug and socket.

Figure 1A:
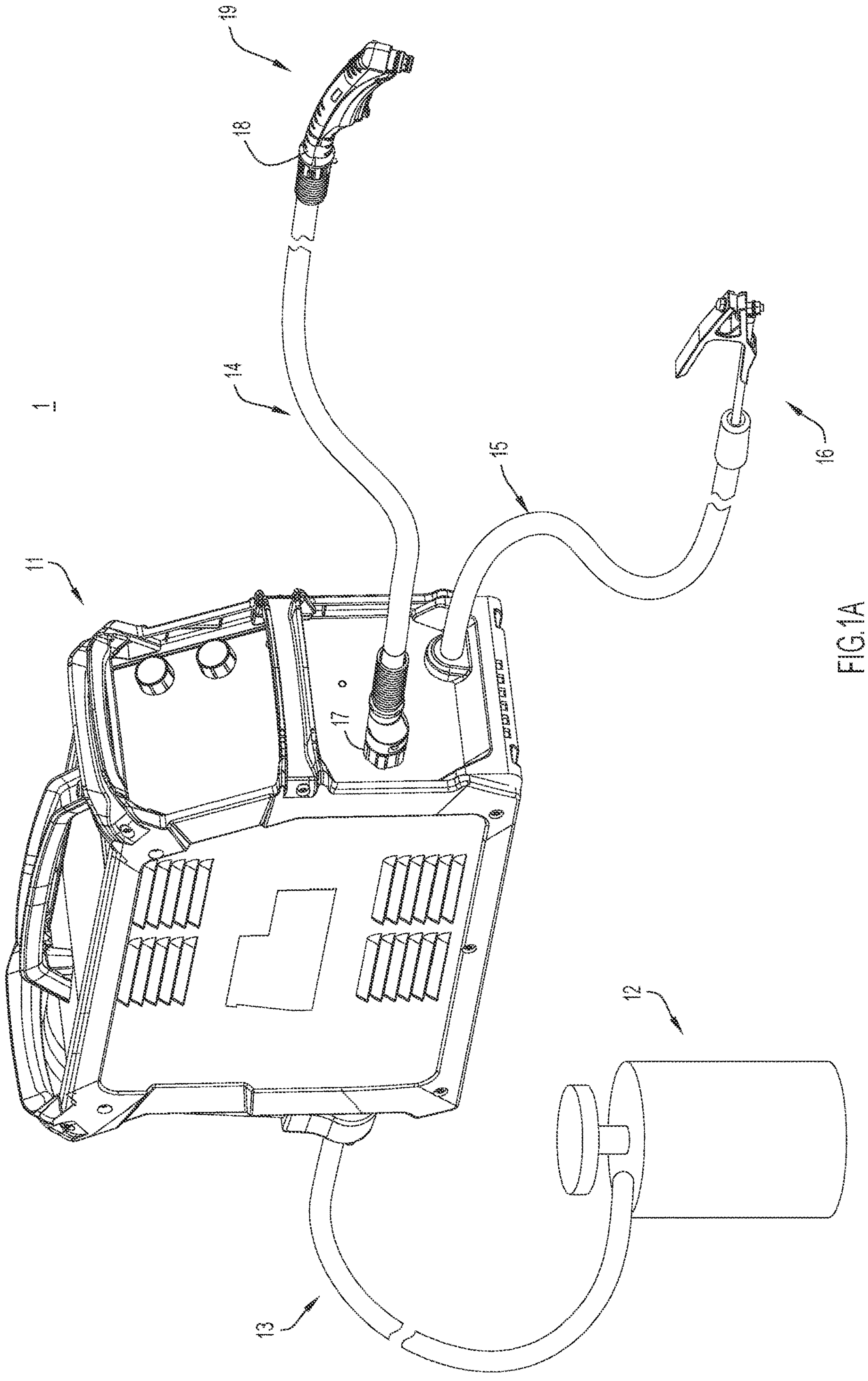
FIG. 1A is a perspective view of a processing system, according to an exemplary embodiment.
Figure 1B:
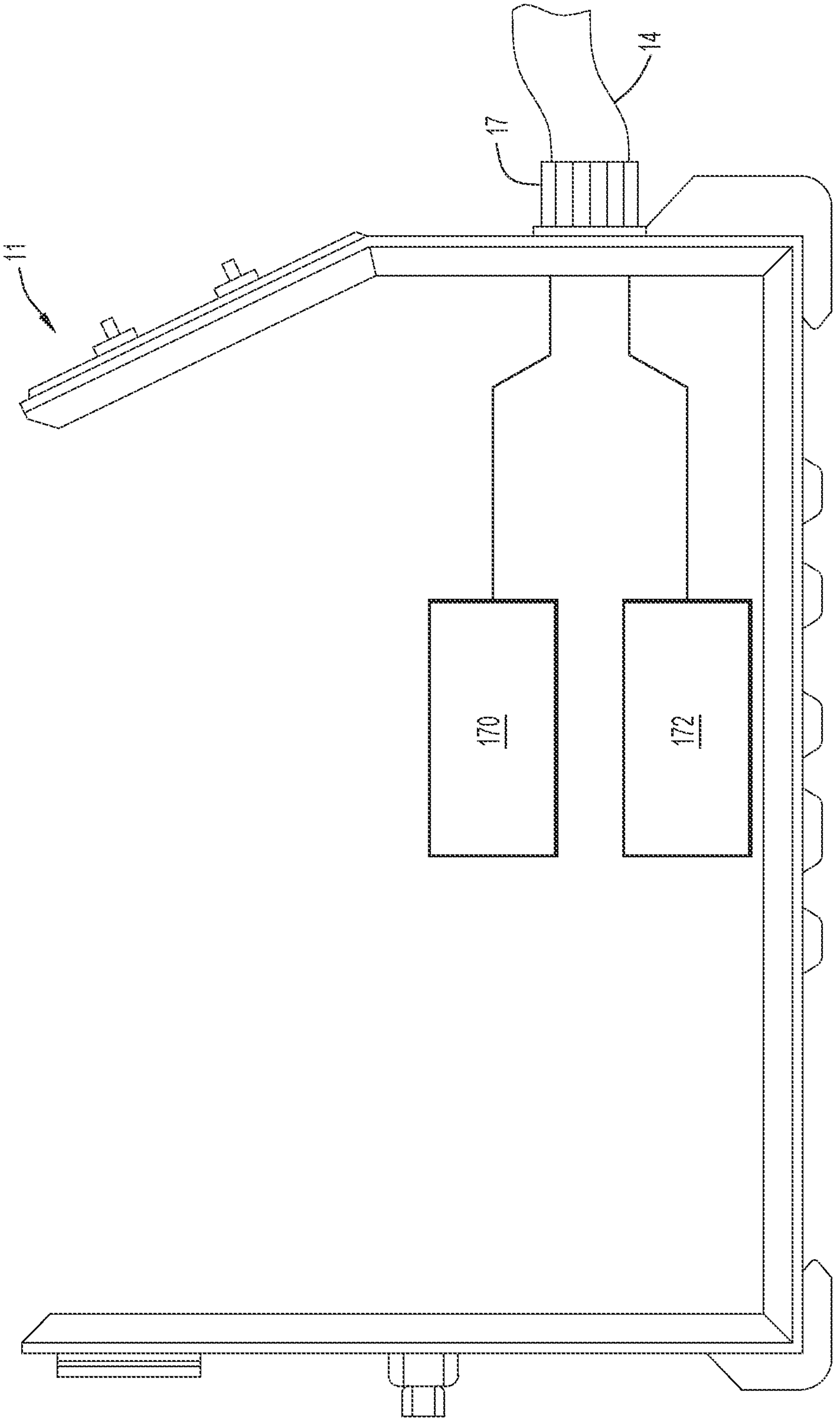
FIG. 1B is a side view of a portion of the processing system of FIG. 1A.

FIGS. 1A and 1B illustrates an exemplary embodiment of a processing system 1 with a connector 17 and a torch 19. The torch 19 may be a welding torch or a plasma cutting torch. The depicted system 1 includes a power supply 11 that supplies power to the torch 19. For example, the power supply 11 provides an electrical current at a predetermined voltage for generating an arc between the torch 19 and a workpiece. The power supply 11 may also control the flow of a process gas from a process gas supply 12 to the torch 19 (however, in other implementations, the power supply 11 may supply the process gas itself). The process gas supply 12 may be connected to the power supply via cable hose 13 and the power supply 11 may be connected to the torch 19 via cable hose 14. The system 1 also includes a working lead 15 with a grounding clamp 16 disposed at an end thereof.

Cable hose 13, cable hose 14, and/or working lead 15 may each include various conductors that may transmit data, electricity, signals, gas, etc. between components of the processing system 1 (e.g., between the power supply 11 and the torch 19) and, as is illustrated, cable hose 13, cable hose 14, and/or working lead 15 may each be any length. In order to connect the aforementioned components of the cutting system 1, the opposing ends of cable hose 13, cable hose 14, and/or working lead 15 may each be coupled to the gas supply 12, power supply 11, torch 19, or clamp 16 with the connector presented herein. Alternatively, one or more of these connections might be achieved with the connector presented herein while other connections are achieved in any manner now known or developed hereafter (e.g., a releasable connection).

More specifically, as an example, the cable hose 14 may include a first connector 17 that releasably couples a first end of the cable hose 14 to a port of the power supply 11 and may also include a second connector 18 that releasably couples a second end of the cable hose 14 to the torch 19, and connector 17 and/or the second connector 18 may be each be the connectors presented herein. Thus, the torch 19 may be releasably coupled to the power supply 11 via a releasable connection formed between the cable hose 14 and the power supply 11 and/or via a releasable connection formed between the cable hose 14 and the torch 19. Additionally or alternatively, other connections in processing system 1 may be formed with conventional connectors or the connectors presented herein.

Now turning to FIG. 1B, according to some implementations, power and data signals may be supplied to the torch by a power source 170 and a controller 172. For example, the power supply 11 may include a power source 170 configured to deliver AC or DC power of a first voltage to the torch 19 through a first conductor extending through the cable hose 14, and a controller 172 configured to deliver one or more electrical signals at a second voltage less than the first voltage to torch 19 through one or more second conductors also extending through the cable hose 14.

Figure 2B:
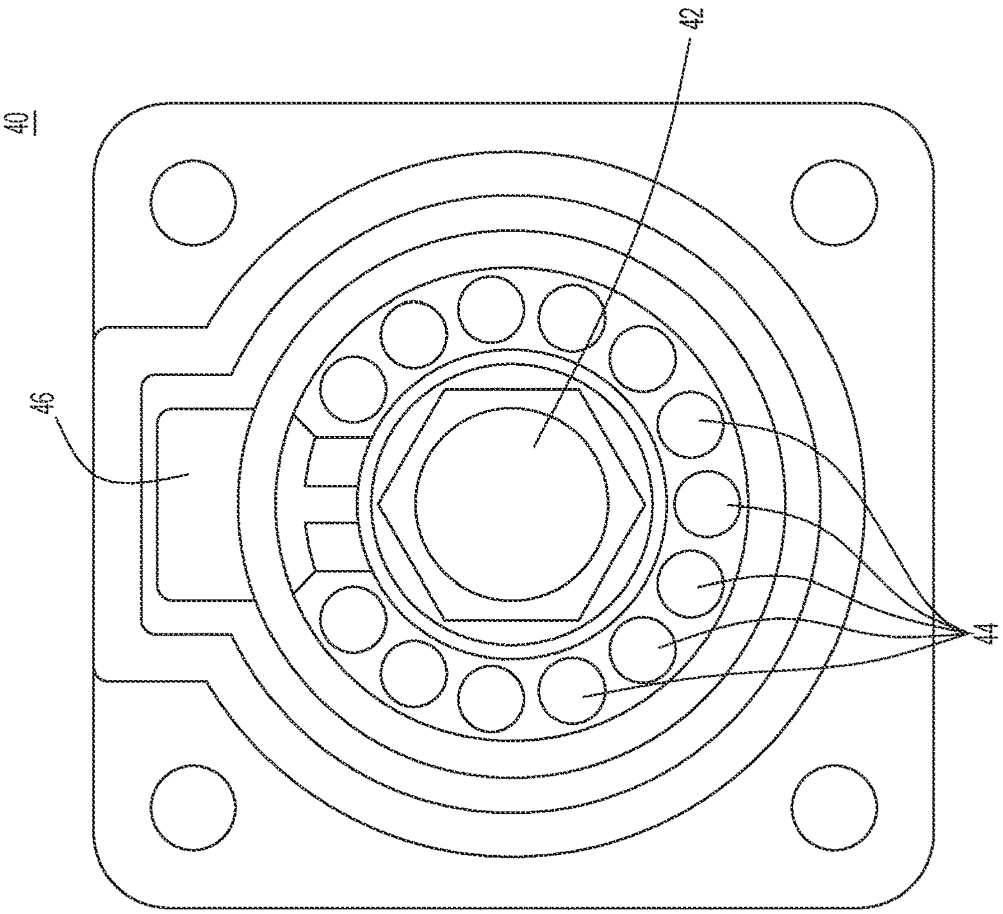
FIG. 2B is a front view of a conventional socket of a conventional connector.
Figure 2A:
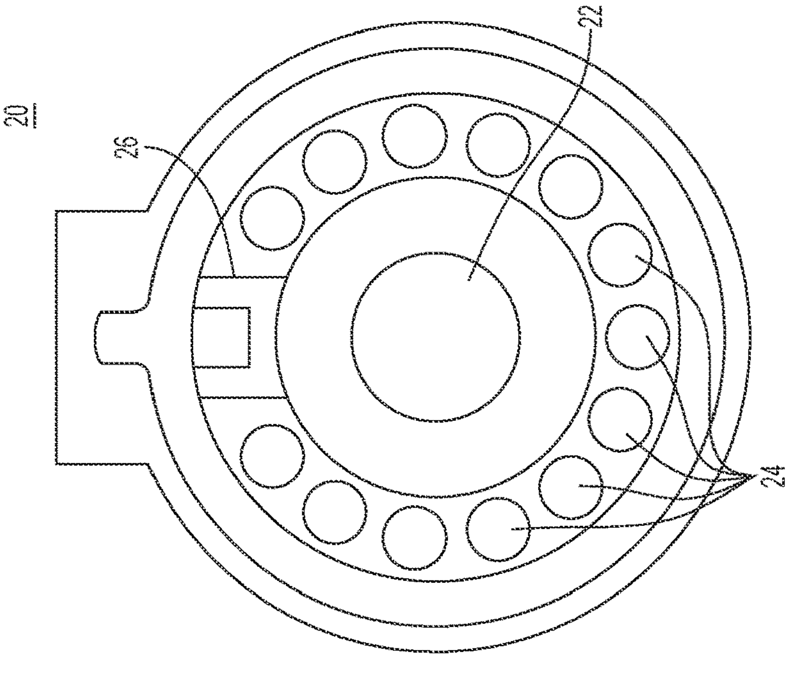
FIG. 2A is a front view a conventional plug of a conventional connector.

FIGS. 2A and 2B depict a conventional connector. The conventional connector includes a plug 20 and socket 40. The plug 20 includes a post 22 and one or more pins 24 radially offset from the post 22. For example, the one or more pins 24 may be radially disposed about the post 22. The socket includes a post receptacle 42 with one or more pin receptacles 44 radially offset from the post receptacle 42. For example, the one or more pin receptacles 44 may be disposed radially disposed about the post receptacle 42. In this arrangement, the plug 20 and socket 40 must be radially aligned such that the post 22 and pins 24 connect with the corresponding post receptacle 42 and pin receptacles 44. In fact, to facilitate this connection, the plug 20 includes a keying element 26 and the socket 40 includes a corresponding keying element 46 to help achieve the proper alignment. The post 22 may be a conductor that conducts process gas and a current/voltage to/from the post receptacle 42. The pins 24 may be conductors that conduct signals to/from the pin receptacles 44.

Figure 3A:
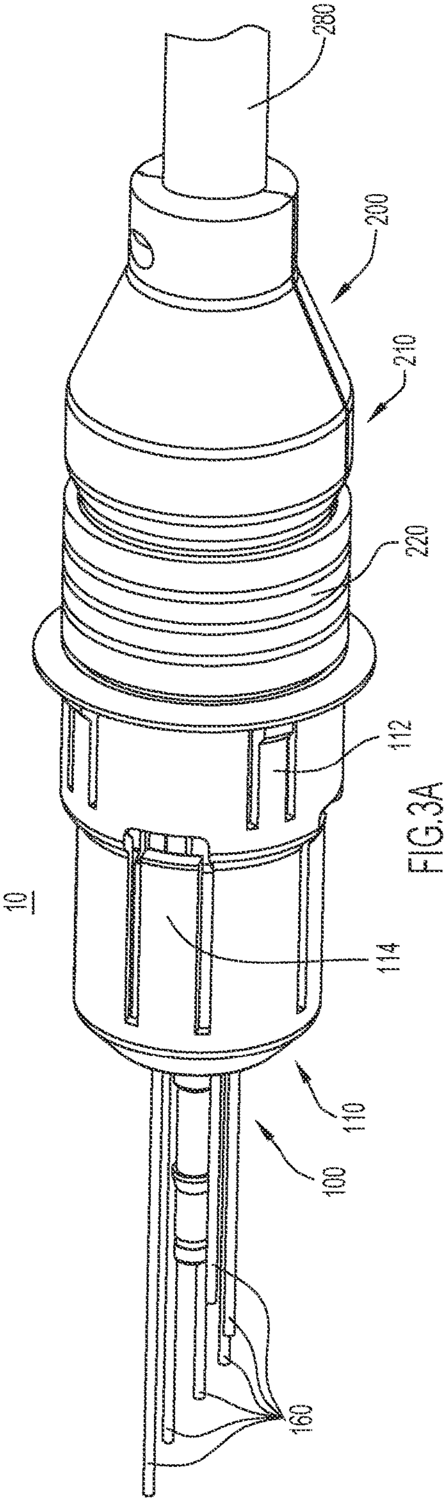
FIG. 3A is a perspective view of a connector, according to an exemplary embodiment.
Figure 3B:
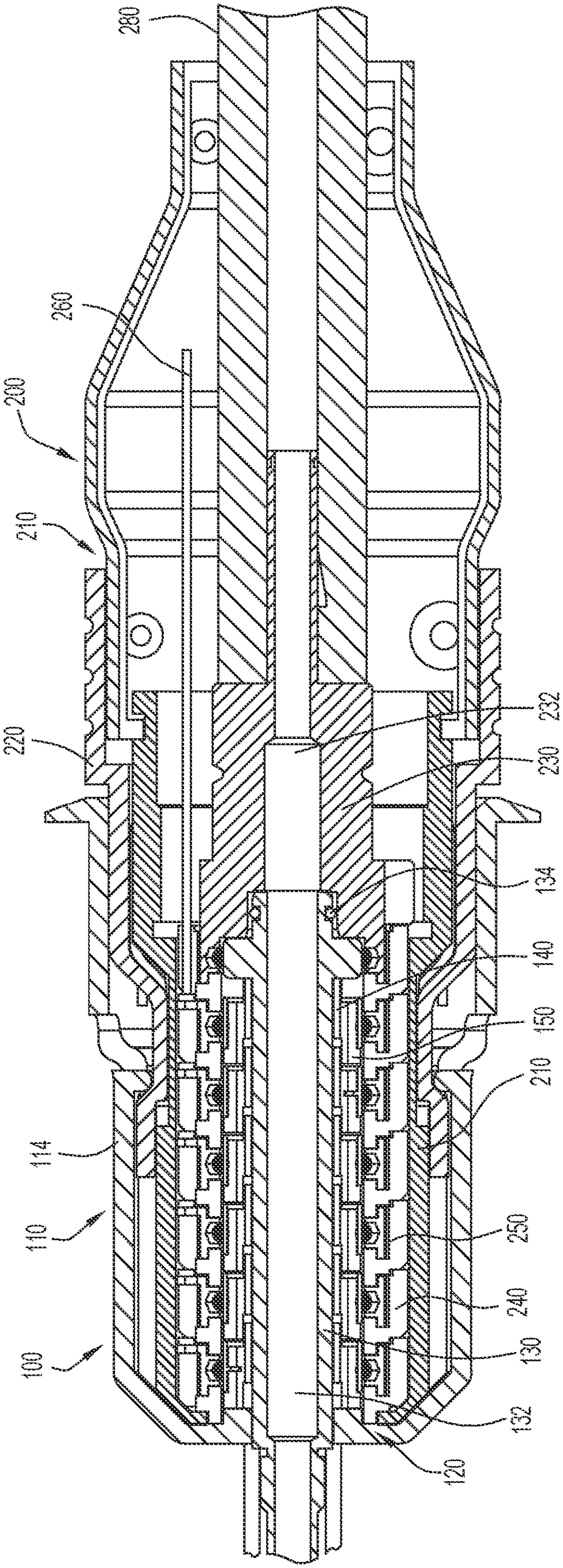
FIG. 3B is a cross-sectional view of the connector of FIG. 3A.

FIGS. 3A and 3B illustrate an exemplary embodiment of a coradial connector 10 having a socket 100 and plug 200, according to an embodiment. Both figures illustrate the plug 200 received in the socket 100. The connector 10 may be representative of connector 17, 18 of FIG. 1A, however, embodiments are not limited thereto. Referring to FIG. 3A, the socket 100 includes a socket housing 110 having a retention tab 112 for engaging a housing of a device, e.g., power supply 11 or torch 19 of FIG. 1A. The socket housing 110 further includes tabs 114 for engaging a housing 210 and collar 220 of the plug 200. The engagement of the tabs 114 with the plug housing 210 and collar 220 retains the plug 200 within the socket 100. The tabs 114 may be disengaged by actuation of collar 220, which may allow the plug 200 to be removed from the socket, as is discussed further below with reference to FIGS. 10A-13B.

FIG. 3B is a cross-sectional view of the connector 10 with the plug 200 received in the socket 100. Referring to FIG. 3B, the socket 100 includes a post 120 having a process conductor 130, one or more socket insulators 140, and one or more socket conductors 150. Each socket conductor 150 may be electrically coupled to a corresponding signal wire 160. The one or more socket insulators 140 are disposed between the one or more socket conductors 150 and the socket process conductor 130 to electrically isolate each of the one or more socket conductors 150 from each other and/or the socket process conductor 130. In the depicted embodiment, the one or more socket conductors 150 are rings disposed adjacent to one another along a longitudinal axis of the post 120, and are coaxial with the socket process conductor 130. Additionally, in the depicted embodiment, a radius of each socket conductor 150 is substantially the same. That is, the socket conductors 150 share the substantially same radius and are distributed along the longitudinal axis of the post 120. However, in other embodiments, the socket conductors 150 may have other shapes of any size, including mismatched shapes and sizes within a single socket 100.

The plug 200 includes a housing 210 having a plug process conductor 230, one or more plug insulators 240, and one or more plug conductors 250. The plug may be connected to a cable 280. Each plug conductor 250 may be electrically coupled to a corresponding signal wire 260 (for simplicity, only one is shown in FIG. 3B). The one or more plug insulators 240 are disposed between the one or more plug conductors 250 to electrically isolate the one or more plug conductors 250 from each other and/or the plug process conductor 230. In the depicted embodiment, the one or more plug conductors 250 are rings disposed adjacent to one another along a longitudinal axis of the plug housing 210, and are coaxial with the plug process conductor 230 and plug housing 210. Additionally, a radius of each plug conductor 250 is substantially the same. That is, in the depicted embodiment, the plug conductors 250 share the substantially same radius and are distributed along the longitudinal axis of the plug housing 210. However, in other embodiments, the plug conductors 250 may have other shapes of any size, including mismatched shapes and sizes within a single plug 200. Regardless, inner surfaces of the one or more insulators 240, and one or more conductors 250 define a plug cavity 270 (See FIGS. 4 and 10B) for receiving the socket post 120.

When the plug 200 is received in the socket 100, the socket post 120 is received by the plug cavity 270. The plug process conductor 230 may be electrically coupled to the socket process conductor 130, and each plug conductor 250 of the one or more plug conductors 250 may be electrically coupled to a corresponding socket conductor 150. Specifically, in the depicted embodiment, a radially outer surface of the socket process conductor 130 is in contact with a radially inner surface of the plug process conductor 230. That is, a distal end of the socket process conductor 130 is adjacent to and concentric with a distal end of the plug process conductor 230. Similarly, in the depicted embodiment, a radially outer surface of a socket conductor 150 is in contact with a radially inner surface of a corresponding plug conductor 250. However, in other embodiments, one or more of these arrangements could be reversed. Additionally, or alternatively, a conductive compliant, or resilient, member 251 (see FIG. 5C) may be disposed between the socket conductors 130, 150 and plug conductors 230, 250, as is described in further detail below.

Accordingly, a process current/voltage may be transmitted from a power source (e.g., power supply 11 of FIG. 1A) to a torch (e.g., torch 19 of FIG. 1A), through the socket process conductor 130 and the plug process conductor 230 and one or more cable hoses (e.g., cable 280) extending therebetween. Similarly, signals (e.g., currents/voltages, optical signals, etc.) may be transmitted between one or more controllers in the power supply 11 and/or the torch 19 via the socket wires 160, the one or more socket conductors 150, the one or more plug conductors 250, and the one or more signal wires 260.

Additionally, or alternatively, the plug 200 may be configured form a fluid connection with the socket 100. For example, the socket process conductor 130 may include a socket fluid channel 132 and the plug process conductor 230 may include a plug fluid channel 232. When the plug 200 is received by the socket 100, the socket fluid channel 132 and the plug fluid channel 232 are fluidly coupled. For example, a process fluid (e.g., liquid or gas) may flow through the channels to the torch 19 via the cable 280. A seal 134 may be disposed between the socket process conductor 130 and the plug process conductor 230 to prevent the fluid from leaking.

Because the socket conductors 130, 150 and corresponding plug conductors 230, 250 extend circumferentially, the plug 200 can have any radial orientation with respect to the socket 100 without decoupling the electrical and/or fluid connections between the socket conductors 130, 150 and plug conductors 230, 250. That is, the radial inner surfaces of the plug conductors 230, 250 may maintain an electrical coupling with the outer surfaces of the socket conductors 130, 150 and fluid may continue to flow through fluid channels 132 and 232 regardless of the radial orientation of the plug 200 with respect to the socket 100. Thus, a cable or a device connected to the plug 200 may be reoriented after the plug 200 is inserted into the socket 100.

Figure 4:
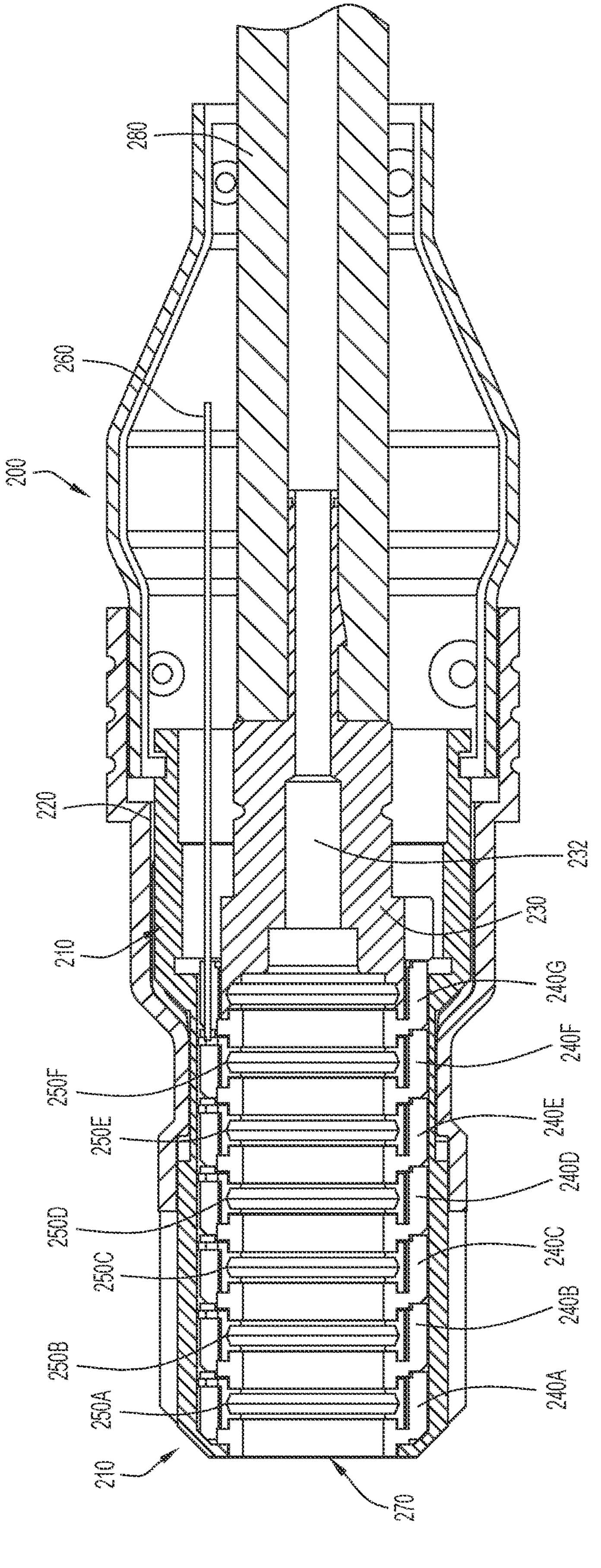
FIG. 4 is a cross-sectional view of a connector plug, according to an exemplary embodiment.

Referring to FIG. 4, a cross-sectional view of the plug 200 attached to a torch cable 280 is shown, according to an exemplary embodiment. In this embodiment, a process conductor 230, seven plug insulators 240A-240G, and six signal conductors 250A-250F are disposed in the plug housing 210. While the plug 200 is shown as having seven plug insulators 240A-240G, and six signal conductors 250A-250F, embodiments are not limited thereto. The plug 200 may have any number of plug insulators 240 and any number of signal conductors 250. For example, the plug 200 may have less than seven plug insulators 240, or more than seven plug insulators 240. Similarly, the plug 200 may have less than six signal conductors 250 or more than six signal conductors 250. The plug insulators 240A-240G and signal conductors 250A-250F are alternately stacked along the longitudinal axis of the housing 210 and define the plug cavity 270. That is, an insulator 240 is disposed between each conductor 250A-250F to prevent an electrical path between signal conductors 250A-250F. Further, insulator 240G prevents a flow of electricity between process conductor 230 and signal conductor 250F.

Figure 5A:
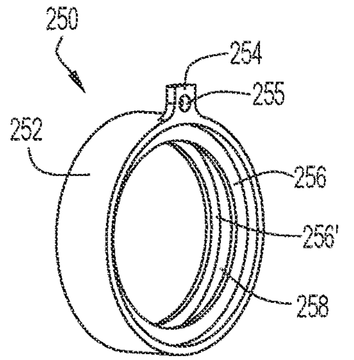
FIG. 5A is a front perspective view of a plug conductor according to an exemplary embodiment.
Figure 5B:
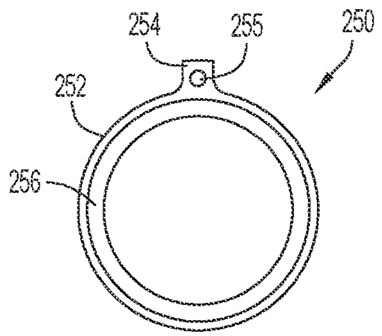
FIG. 5B is a front view of the plug conductor of FIG. 5A.
Figure 5C:
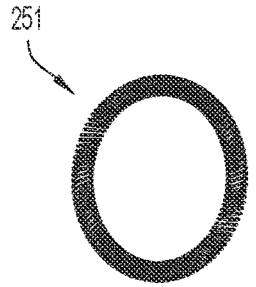
FIG. 5C is a perspective view of a compliant member, according to an embodiment.

FIGS. 5A and 5B illustrate the signal conductor 250, according to an exemplary embodiment. FIG. 5A is a front perspective view of the signal conductor 250, and FIG. 5B is a front view of the signal conductor 250. In the depicted embodiment, the signal conductor 250 has a circular or ring shape and includes a sidewall 252, a wire contact 254 extending radially outward from the sidewall 252, and one or more protrusions 256, 256' extending radially inward from the sidewall 252. The wire contact 254 includes a cavity 255 for receiving a signal conductor, e.g., a wire. The cavity 255 may be a through hole or other feature for electrically coupling to the wire. The protrusions 256, 256' extend circumferentially about an inner surface of the sidewall 252 and in the depicted embodiment are parallel protrusions that extend completely around the inner surface of the sidewall 252. The protrusions 256, 256' and sidewall 252 define a groove 258. In the depicted embodiment, the groove has constant dimensions, but in other embodiments, the protrusions 256, 256' could have varied or offset dimensions and define a tapered or irregularly shaped groove.

In some implementations, a conductive compliant member 251 (see FIG. 5C) may be disposed in the groove 258. The conductive compliant member 251 may be a canted coil spring conductor ring. That is, the conductive compliant member 251 may be a canted coiled spring having circular, torus, or ring shape. The compliant member 251 may facilitate electrical coupling between the plug conductors 230, 250 and respective socket conductors 130, 150. In some implementations, the conductive compliant member may be a protrusion extending from at least one of the socket conductor 150 and the plug conductor 250.

Figure 6A:
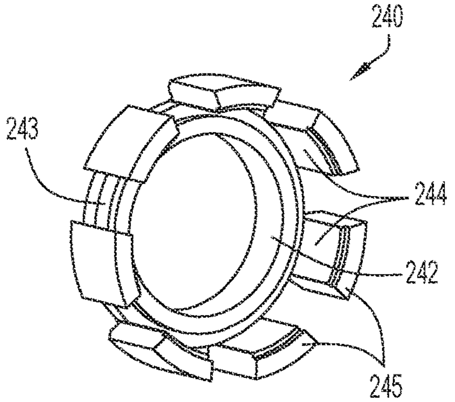
FIG. 6A is a rear perspective view of a plug insulator, according to an embodiment.
Figure 6B:
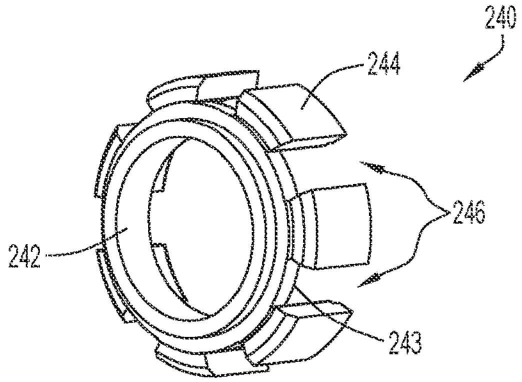
FIG. 6B is a front perspective view of the plug insulator of FIG. 6A.
Figure 6C:
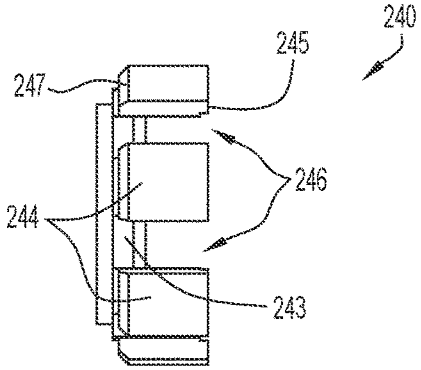
FIG. 6C is a side view of the plug insulator of FIG. 6A.
Figure 6D:
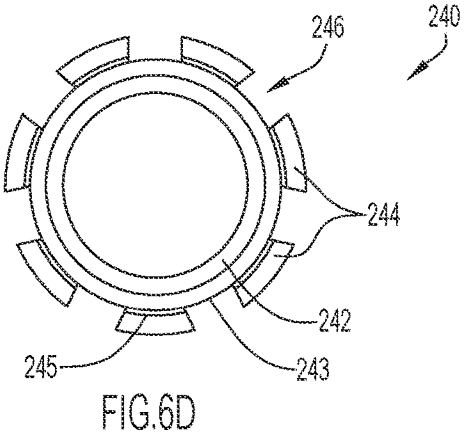
FIG. 6D is a front view of the plug insulator of FIG. 6A.

FIGS. 6A-6D depict the plug insulator 240, according to an exemplary embodiment. FIGS. 6A and 6B provide rear perspective (FIG. 6A) and front perspective (FIG. 6B) views of the plug insulator 240. FIGS. 6C and 6D are side (FIG. 6C) and front (FIG. 6D) views of the plug insulator 240. As can be seen, the plug insulator 240 includes a sidewall 242 having a circular or ring shape, a protrusion 243 extending radially outward from the sidewall 242 along a circumference of the sidewall 242 and a plurality of radially disposed fingers 244 extending perpendicularly from the protrusion 243. The fingers 244 are separated by gaps 246. Bearing grooves 245 may be disposed on a distal end of each finger 244 and be configured to engage a bearing portion 247 disposed at a distal end of the finger 244 of another insulator 240. For example, the bearing grooves 245 of fingers 244 of insulator 240A may be configured to engage a bearing portion 247 disposed at a proximal end of finger 244 of insulator 240B.

Further, referring back to FIG. 4, a conductor 250, e.g., conductor 250A, may be disposed and retained between insulators 240A and 240B. When retained between the insulators 240A and 240B, the wire contact 254 of the conductor 250 is aligned with one of the insulator gaps 246. The gaps 246 provide passages for conductors, or wires, to extend from the cable 280 to corresponding signal conductors 250. For example, a first wire 260 may extend from cable 280 through a first set of gaps 246 of insulators 240G, 240F, 240E, 240D, 240C, and 240B to reach wire contact 254 of signal conductor 250A. A second wire 260 may extend from the cable 280 through a second set of gaps 246 (radially offset from the first set of gaps 246) of insulators 240G, 240F, 240E, 240D, and 240C to reach wire contact 254 of signal conductor 250B.

In the depicted embodiment, seven sets of gaps can accommodate seven wires (or more if a gap receives more than one wire); however, in other embodiments, the insulators 240 could define any number of gaps. Accordingly, a plurality of wires 260 may be radially disposed about the plug conductors 230, 250. Further, with this layout/arrangement, the wire contacts 254 of the signal conductors 250A-250F are disposed radially offset from one another. That is, the wire contacts 254 are radially arranged within the plug housing 210 with a corresponding wire 260.

In some implementations, at least a portion the signal conductor 250 and/or plug insulator 240 may be compliant or resilient to facilitate electrical coupling between the plug signal conductors 250 and socket signal conductors 150.

Figure 7:
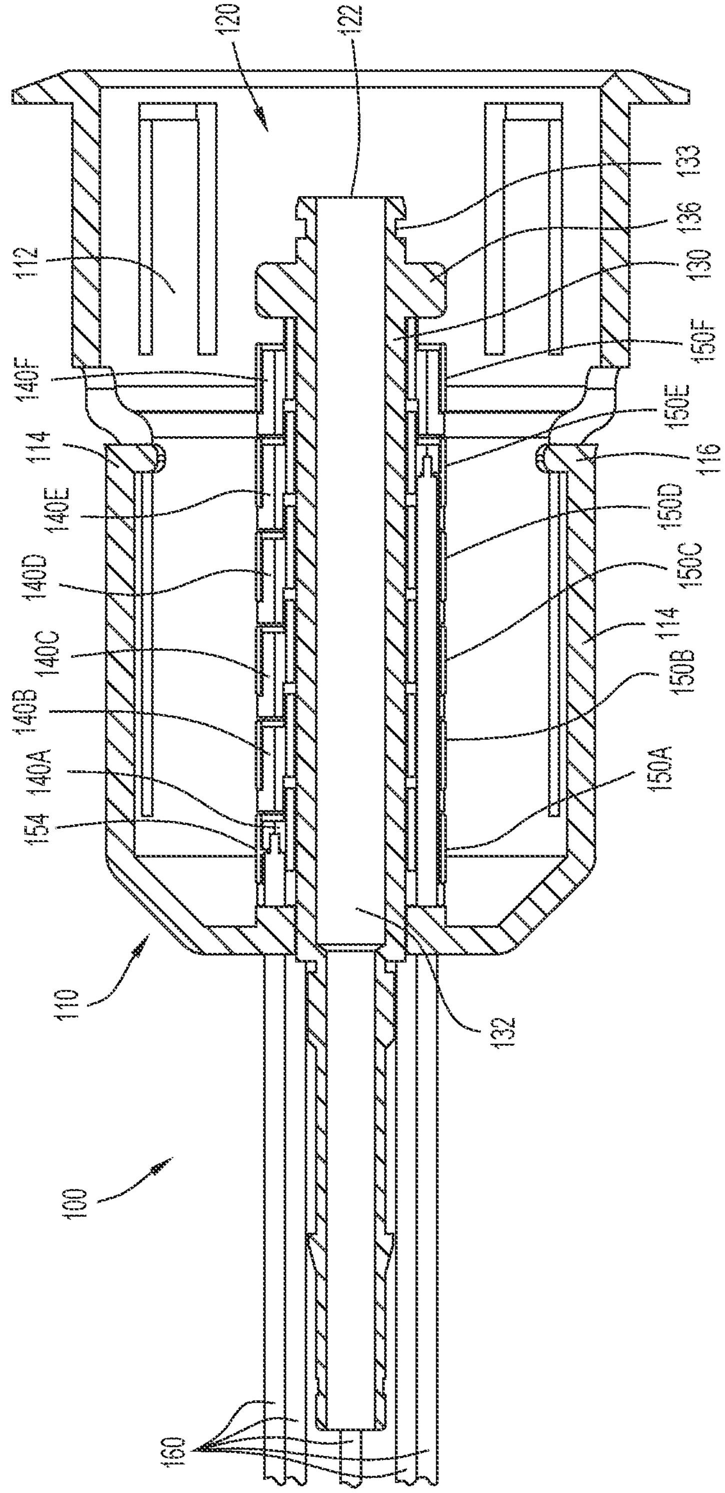
FIG. 7 is a cross-sectional view of a connector socket, according to an exemplary embodiment.

Referring to FIG. 7, a cross-sectional view of the socket 100 of the connector system 10 is shown, according to an exemplary embodiment. The socket post 120 includes a process conductor 130, with six socket insulators 140A-140F, and six signal conductors 150A-150F are disposed along the post 120 within the socket housing 110. While the socket 100 is shown as having six socket insulators 140A-140F, and six signal conductors 150A-150F, embodiments are not limited thereto. The socket 100 may have any number of socket insulators 140 and any number of signal conductors 150. For example, the socket 100 may have less than six socket insulators 140, or more than six socket insulators 140. Similarly, the socket 100 may have less than six signal conductors 150 or more than six signal conductors 150. The socket insulators 140A-140F and signal conductors 150A-150F are alternately stacked along the longitudinal axis of the process conductor 130. That is, an insulator 140 is disposed between each conductor 150A-150F to prevent an electrical path between signal conductors 150A-150F. Further, insulator 140F prevents a flow of electricity between signal conductor 150F and process conductor 130 and/or signal conductor 150E.

The process conductor 130 may include a contact portion 136 for providing an electrical coupling to the plug process conductor 230 when post 120 is received in the post cavity 270 of the plug 200. The contact portion 136 may have a larger radius than a remainder of the process conductor 130. For example, the contact portion 136 may be a radial protrusion that extends circumferentially about a longitudinal axis of the process conductor 130. The process conductor 130 may also include a seal channel 133 for receiving a fluid seal (e.g., an O-ring). The channel 133 may be disposed near a distal end 122 of the post 120.

Figure 8B:
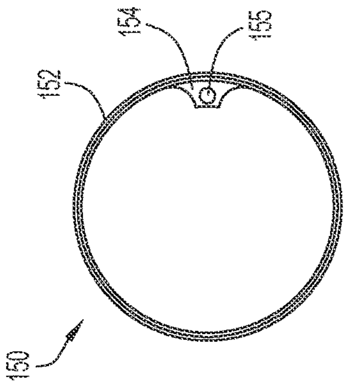
FIG. 8B is a front view of the socket conductor of FIG. 8A.
Figure 8A:
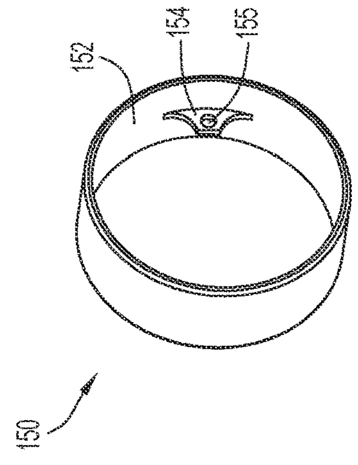
FIG. 8A is a front perspective view of a socket conductor according to an exemplary embodiment.

FIGS. 8A and 8B illustrate the signal conductor 150, according to an exemplary embodiment. FIG. 8A is a front perspective view of the signal conductor 150, and FIG. 8B is a front view of the conductor ring 150. As can be seen, the signal conductor 150 has a circular or ring shape and includes a sidewall 152, and wire contact 154 extending radially inward from the sidewall 152. The wire contact 154 may include a cavity 155 for receiving a signal conductor, e.g., a wire. The cavity 255 may be a through hole or any other feature for electrically coupling to the wire.

Figure 9D:
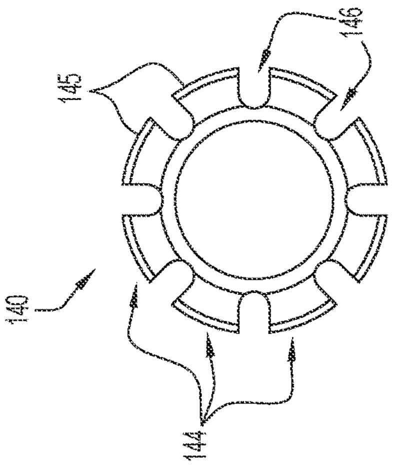
FIG. 9D is a front view of the socket insulator of FIG. 9A.
Figure 9C:
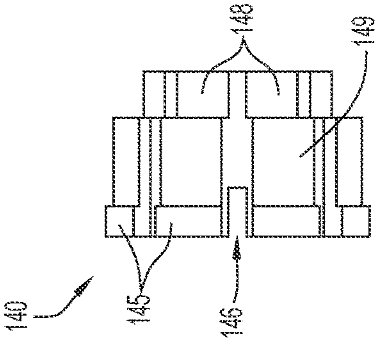
FIG. 9C is a side view of the socket insulator of FIG. 9A.
Figure 9B:
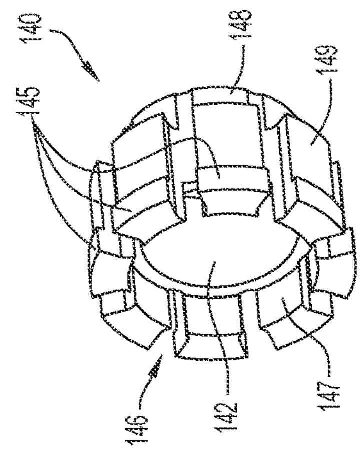
FIG. 9B is a rear perspective view of the socket insulator of FIG. 9A.
Figure 9A:
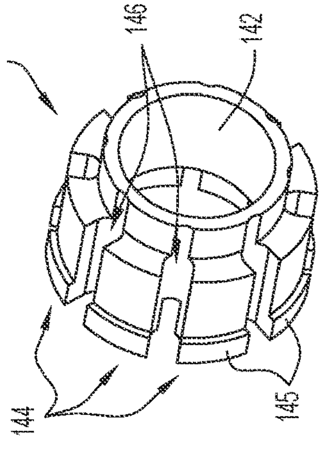
FIG. 9A is a front perspective view of a socket insulator, according to an embodiment.

FIGS. 9A-9D depict the socket insulator 140, according to an exemplary embodiment. FIGS. 9A and 9B are front perspective (FIG. 9A) and rear perspective (FIG. 9B) views of the socket insulator 140. FIGS. 9C and 9D are side (FIG. 9C) and rear (FIG. 9D) views of the socket insulator 140. As can be seen, the socket insulator 140 includes a sidewall 142 having a circular or ring shape, and a plurality of radially disposed fingers 144 extending radially from the sidewall 142. The fingers 144 have a radially inner surface 147 and a radially outer surface 149. The fingers 144 are separated by gaps 146. Moreover, in the depicted embodiment, teeth 145 are disposed on the radially outer surfaces 149 at a distal end of each finger 144 and may be configured to engage the signal conductor 150. The fingers 144 may be configured to engage a sidewall 142 of another socket insulator 140. That is, the radially inner surfaces 147 of the fingers 144 may be configured to conform to a radially outer surface 148 of a sidewall 142 of another socket insulator 140.

For example, referring back to FIG. 7, a conductor 150, e.g., conductor 150A, may be disposed and retained between two insulators 140, e.g., socket insulators 140A and 140B. That is, the conductor 150A may be disposed on the radially outer surface 149 of the fingers 144 of socket insulator 140A, and may abut the teeth 145. The fingers 144 of socket insulator 140B may engage the sidewall 142 of socket insulator 140A and prevent the conductor 150A from sliding off of socket insulator 140A. That is, the outer surfaces 149 of the fingers 144 of socket insulator 140A engage the sidewall 152 of the conductor 150A, and the inner surface 147 of the fingers 144 of socket insulator 140B engage the outer surface 148 of the sidewall 142 of insulator 140B. Thus, the conductor 150A may be retained between insulators 140A and 140B. While the retention arrangement of an insulators 140 and a conductor 150 is described above with reference to insulators 140A and 140B and conductor 150, the retention arrangement may be applied to insulators 140A-140F and conductors 150A-150F. Alternatively, other retention arrangements might be used in place of or in combination with the depicted retention arrangement.

When retained between the insulators 140A and 140B, the wire contact 154 of the conductor 150 is aligned with one of the insulator gaps 146. The gaps 146 provide passages for conductors, or wires 160, to extend from the power supply or controller to corresponding signal conductors 150. For example, a first wire 160 may extend from the power supply through a first set of gaps 146 of insulators 140A, 140B, 140C, 140D, and 140E, to reach wire contact 154 of signal conductor 150E. A second wire 160 may extend from the power supply or controller through a second set of gaps (radially offset from the first set of gaps) of insulators 140A, 140B, 140C, and 140D to reach wire contact 154 of signal conductor 150D. Accordingly, each conductor 150A-150F may be electrically coupled to a corresponding wire 160 extending through gaps 146 of insulators 140A-140F.

In the depicted embodiment, eight sets of gaps can accommodate eight wires (or more if a gap receives more than one wire); however, in other embodiments, the insulators 140 could define any number of gaps. Thus, a plurality of wires 160 may be radially disposed about the socket process conductor 130. Further, the wire contacts 154 of the signal conductors 150A-150F are disposed radially offset from one another. That is, the wire contacts 154 are radially arranged about the post 120 and configured to engage a corresponding wire 160.

In some implementations, a compliant, or resilient, member may be used to maintain contact between a socket conductor 150 and a plug conductor 250. In some implementations, the at least one of the socket insulator 140, the socket conductor 150, the plug insulator 240, and the plug conductor ring 250 may be compliant, and may bias the socket conductor 150 towards the plug conductor 250. Additionally, or alternatively, the at least one of the socket insulator 140, the socket conductor 150, the plug insulator 240, and the plug conductor ring 250 may be compliant, and may bias the plug conductor 250 towards the socket conductor 150.

Figure 10A:
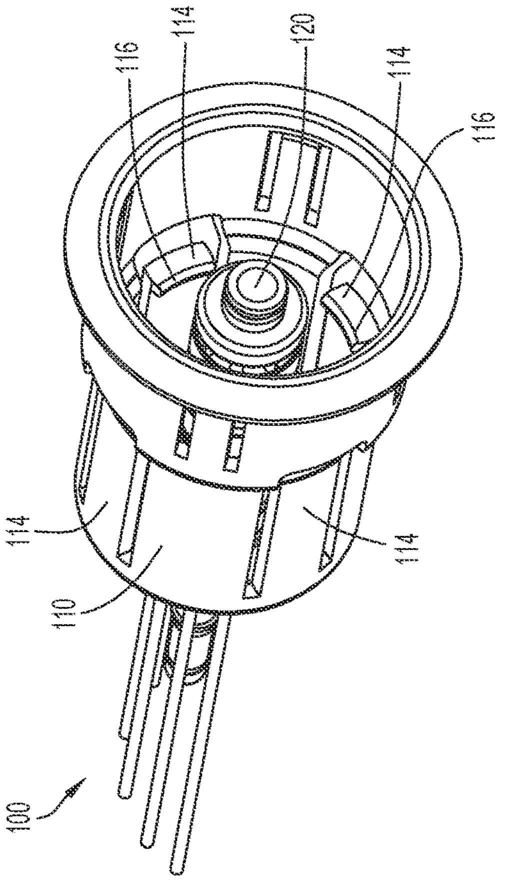
FIG. 10A is a perspective view of the socket, according to an exemplary embodiment.
Figure 10B:
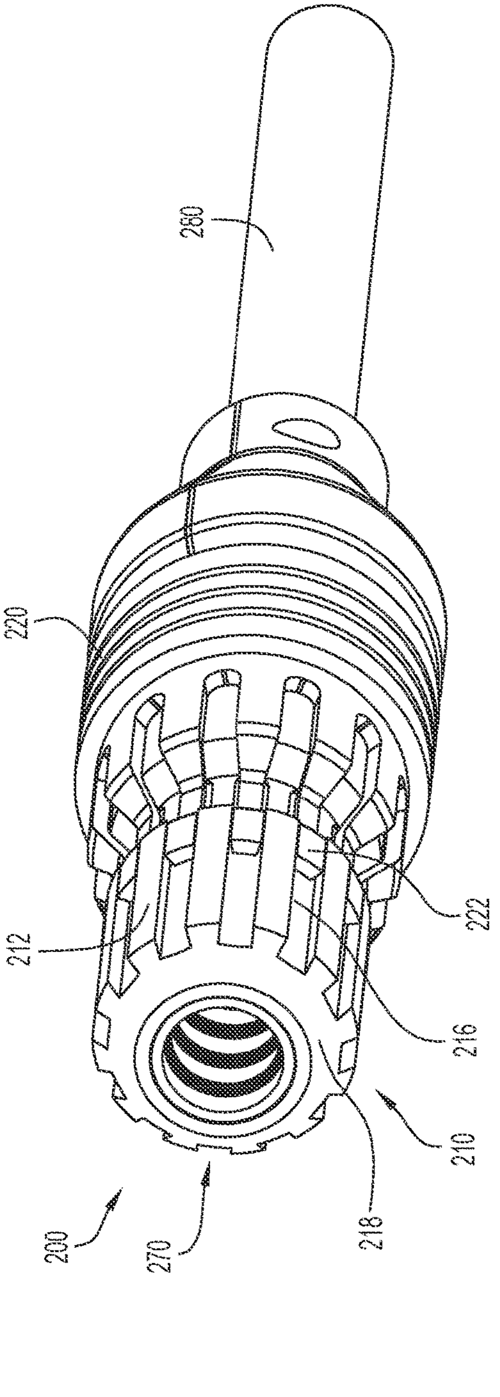
FIG. 10B is a perspective view of plug, according to an exemplary embodiment.
Figure 11:
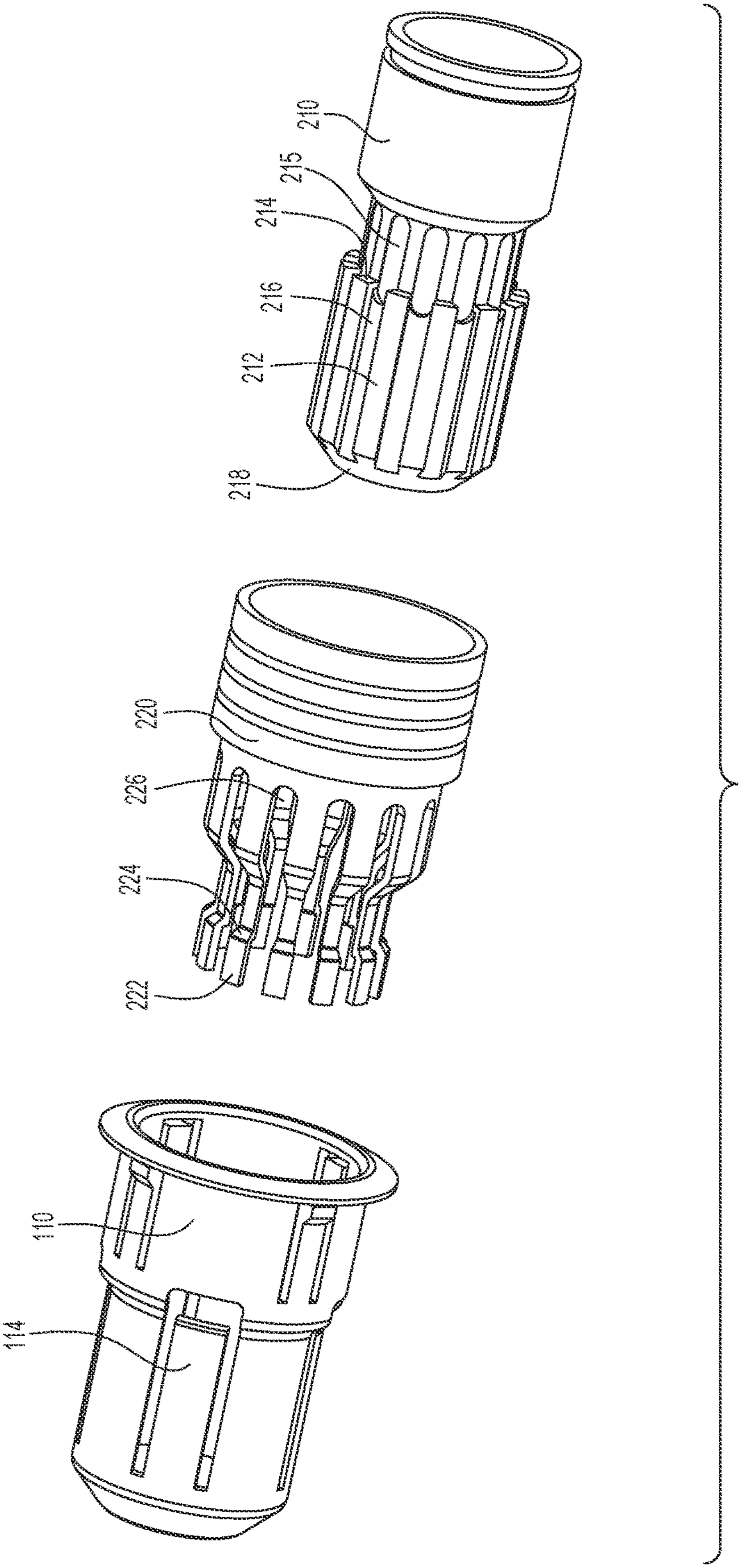
FIG. 11 is an exploded view of a connector, according to an exemplary embodiment.
Figure 12:
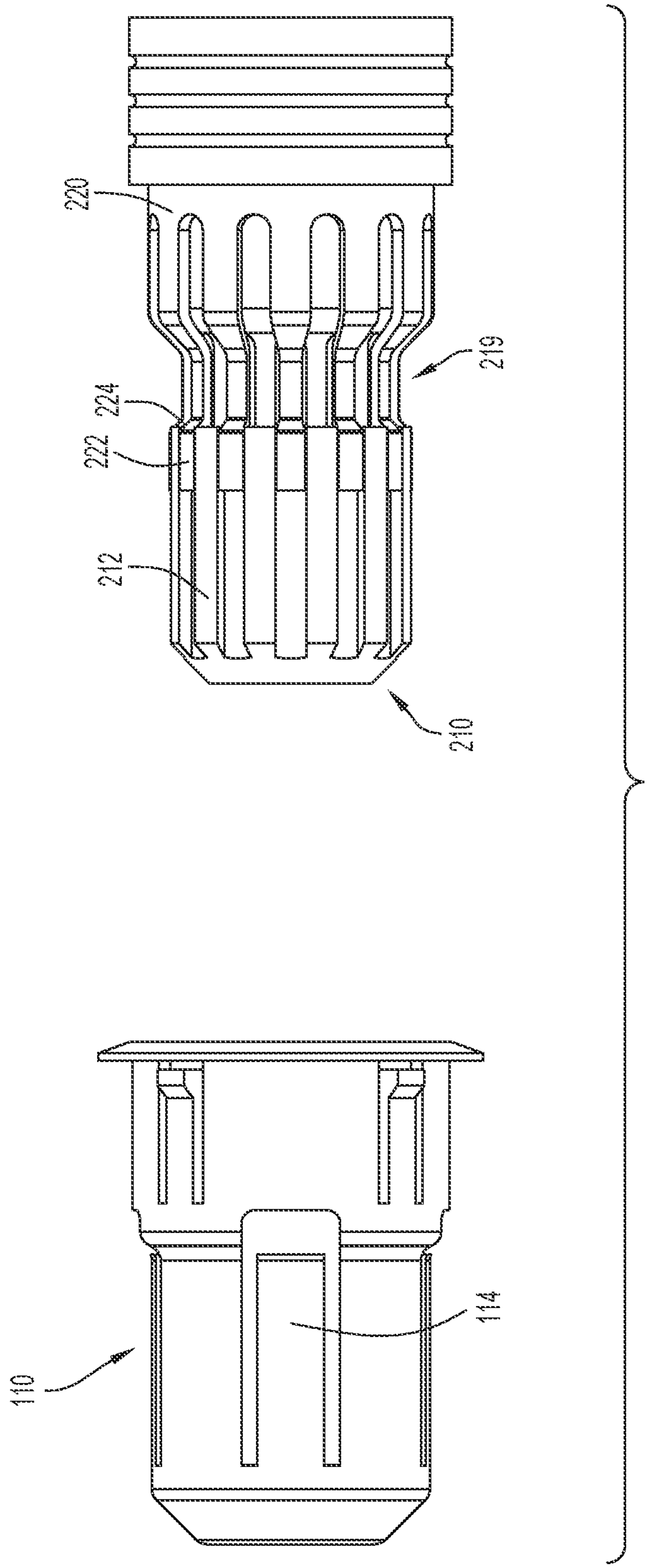
FIG. 12 is a top view of the socket housing and plug housing of FIG. 11.
Figure 13A:
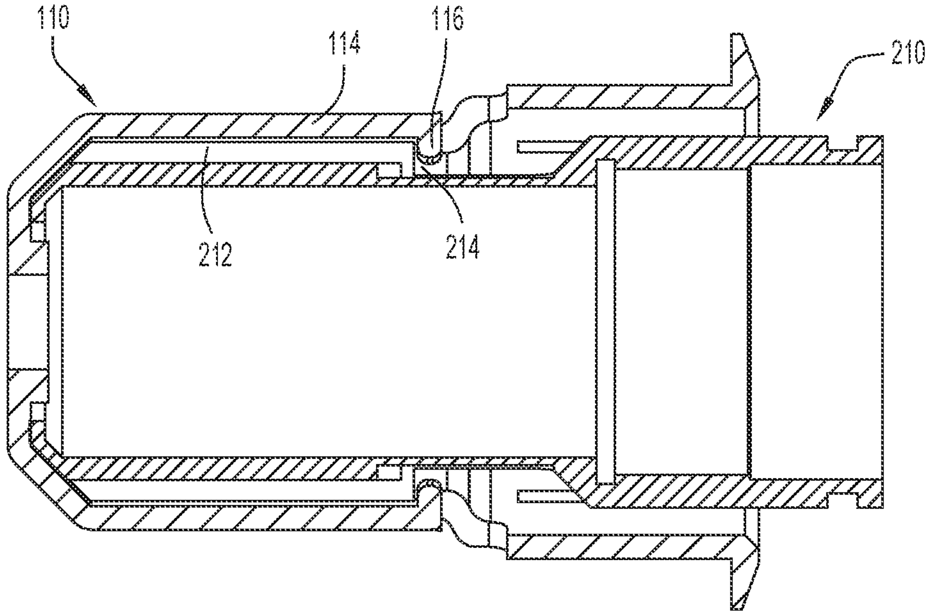
FIG. 13A is a cross sectional view of the plug housing of FIG. 11 received in the socket housing of FIG. 11, but without a collar, according to an exemplary embodiment.
Figure 13B:
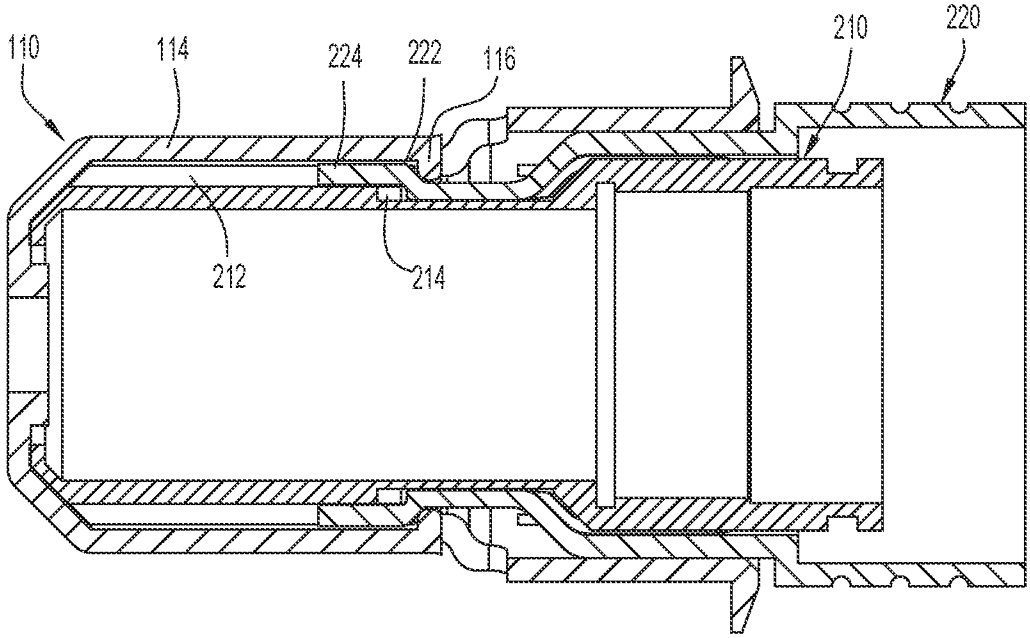
FIG. 13B is a cross sectional view of the plug housing of FIG. 11 with a collar received in the socket housing of FIG. 11, according to an exemplary embodiment.

Reference is now made to FIGS. 10A-13B depicting the engagement and release mechanisms of a connector assembly, according to an embodiment. FIG. 10A is a perspective view of the socket 100, and FIG. 10B is a perspective view of plug 200, according to an exemplary embodiment. FIG. 11 is an exploded view of the socket housing 110, plug housing 210, and collar 220, according to an exemplary embodiment. FIG. 12 is a top view of the socket housing 110 and plug housing 210 according to an exemplary embodiment. FIG. 13A is a cross sectional view of the plug housing 210 received in the socket housing 110. FIG. 13B is a cross sectional view of the plug housing 210 with the collar 220 received in the socket housing 110.

Referring to FIGS. 10A-12, the socket housing 110 may have one or more tabs 114 for engaging the plug 200, each tab 114 having at least one tooth 116. Each tooth 116 may extend radially inward from an inner surface of each tab 114. The plug 200 includes a plug housing 210 having a one or more bearing members 212, (e.g., protrusions extending radially outward from the housing 210), and a collar 220 having one or more of fingers 222 separated by gaps 226. Each finger of the one or more fingers 222 may include a canted surface 224. The one or more bearing members 212 are separated by a plurality of grooves 216. When the plug housing 210 is disposed within the collar 220, the fingers 222 of the collar 220 are disposed in the grooves 216 of the plug housing 210. The combined plug housing 210 and collar 220 further include a trough 219 defining a reduced radius section.

In some implementations, the plug housing 210 may further include a plurality of slots 215 disposed in the trough 219 for receiving a plurality of tabs (not shown) extending radially inward from the fingers 222. The slots 215 and tabs may help maintain the alignment of the fingers 222 and grooves 216 when the collar 220 moves axially along a longitudinal axis of the plug housing 210.

A canted surface 218 disposed at the distal end of the plug housing 210 facilitates insertion of the plug 200 into the socket 100. As the plug 200 is inserted into the socket 100, the canted surface 218 contacts one or more teeth 116 of the one or more tabs 114 and causes the one or more tabs 114 to move radially outward. The one or more teeth 116 slide along the bearing members 212 until the plug 200 is fully received by the socket 100. At that point, the teeth 116 slide passed the bearing members 212 and into the trough 219, causing the tabs 114 to move radially inward to a resting position. That is, the tabs 114 resiliently move back to their equilibrium position. When the plug 200 is received in the socket 100, and the one or more tabs 114 are in the resting position, at least one bearing member 212 and at least one finger 222 of the plug 200 engage at least one tab 114 of the socket 100. That is, a tooth 116 of at least one tab 114 of the socket housing 110 engages a bearing surface 214 of a bearing member 212 of the plug housing 210 and an adjacent canted surface 224 of a finger 222 of the collar 220.

Referring to FIG. 13A, the engagement between the bearing member 212 and teeth 116 of the tab 114 prevent the plug 200 from being removed from the socket 100. For example, if a force were applied along the longitudinal axis of the plug housing 210 away from the socket 100, either directly by a user or indirectly through tension on the cable 280 (shown in FIGS. 3A and 3B), the one or more bearing surfaces 214 of the one or more bearing members 212 may abut against the teeth 116 of the tab 114, and thus, prevent disengagement of the plug 200 from the socket 100.

Referring to FIG. 13B, to disengage the plug 200 from the socket 100, an axial force (e.g., a force exerted parallel, or at least partially parallel, to longitudinal axes of the plug 200 and socket 100) may be applied to the collar 220, causing the collar 220 to move axially with respect to the socket 100 and plug housing 210. As the collar 220 moves axially, the canted surface 224 of the fingers 222 may apply a radial force to the tab teeth 116, causing the tab 114 to move radially outward. Thus, the one or more tab teeth 116 may be disengaged from the one or more bearing members 212 of the plug housing 210. With the tab teeth 116 disengaged from the bearing members 212, the plug 200 may be removed from the socket 100 and the force applied to the collar 220 may be further applied to the plug housing 210. Thus, applying an axial force to the collar 220 may disengage the tabs 114 from the plug housing 210 and retract the plug 200 from the socket 100. That is, the plug 200 may be removed from the socket 100 with a single pulling force applied at the collar 220.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the coradial connector described herein, or portions thereof may be fabricated from any suitable material or combination of materials, such as plastic, foamed plastic, wood, cardboard, pressed paper, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

Moreover, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Finally, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

What is claimed is:

1. A connector system comprising:

a socket having a socket housing with a tab; and a plug comprising:

a plug housing with a radially positioned bearing surface, wherein the tab is configured to removably engage the bearing surface; and a translatable collar having a plurality of fingers radially disposed about the plug housing, wherein, when the collar is translated, the collar can disengage the tab from the bearing surface to allow the plug to be removed from the socket.

2. The connector system of claim 1, wherein the plug is configured to conduct a process current and a fluid for a welding or cutting operation.

3. The connector system of claim 2, wherein the plug further comprises:

a plug process conductor configured to conduct the process current and the fluid;

a plug signal conductor disposed coaxially with the plug process conductor; and a plug insulator disposed coaxially with the plug process conductor, between the plug process conductor and the plug signal conductor.

4. The connector system of claim 3, wherein the socket further comprises:

a socket process conductor configured to conduct the process current and the fluid;

a socket signal conductor disposed coaxially with the socket process conductor; and a socket insulator disposed coaxially with the socket process conductor, between the socket process conductor and the socket signal conductor.

5. The connector system of claim 4, wherein the plug signal conductor is arranged to correspond to the socket signal conductor.

6. The connector system of claim 4, wherein the plug signal conductor is concentric with the socket signal conductor.

7. The connector system of claim 1, wherein the plug is configured to rotatably connect to the socket; and the plug and the socket are fluidly and electrically coupled when the plug is rotatably connected to the socket.

8. The connector system of claim 1, wherein the plug is configured to be inserted into the socket in any radial alignment to fluidly and electrically couple to the socket.

9. A connector system comprising:

a plug configured to conduct a process current, an electrical signal, and a fluid for a welding or plasma cutting operation; and a socket configured to:

receive the plug regardless of an angular orientation of the plug with respect to the socket; and conduct the process current, the electrical signal, and the fluid.

10. The connector system of claim 9, wherein the plug is configured to rotatably connect to the socket; and the plug and the socket are fluidly and electrically coupled when the plug is rotatably connected to the socket.

11. The connector system of claim 9, wherein the plug further comprises:

a plug process conductor configured to conduct the process current and the fluid;

a plug signal conductor configured to conduct the electrical signal, and disposed coaxially with the plug process conductor; and a plug insulator disposed coaxially with the plug process conductor, between the plug process conductor and the plug signal conductor.

12. The connector system of claim 11, wherein the socket further comprises:

a socket process conductor configured to conduct the process current and the fluid;

a socket signal conductor configured to conduct the electrical signal, and disposed coaxially with the socket process conductor; and a socket insulator disposed coaxially with the socket process conductor, between the socket process conductor and the socket signal conductor.

13. The connector system of claim 9, wherein the plug further comprises a translatable collar having a plurality of fingers radially disposed about a plug housing, and the plug is configured to be removed from the socket in response to a translation of the collar.

14. The connector system of claim 13, wherein the collar is translatable with respect to the plug housing.

15. The connector system of claim 13, wherein the translation of the collar can disengage a retaining tab from the plug, the retaining tab extending from the socket.

16. The connector system of claim 15, wherein the retaining tab engages a bearing surface of the plug, and the plurality of fingers are configured to remove the retaining tab from the bearing surface in response to the translation of the collar.

17. A plug for conducting a process current and a fluid for a welding or plasma cutting operation, the plug comprising:

a process conductor; and a signal conductor;

wherein the plug is configured to:

rotatably connect to a socket; and fluidly and electrically couple to the socket when the plug is rotatably connected to the socket.

18. The plug of claim 17, wherein the plug is configured to be inserted into the socket regardless of an angular orientation of the plug with respect to the socket.

19. The plug of claim 17, further comprising a translatable collar having a plurality of fingers radially disposed about a plug housing, wherein the plug is configured to be removed from the socket in response to a translation of the collar.

20. The plug of claim 19, wherein the collar is translatable with respect to the plug housing.

* * * * *